(12) United States Patent
Kimura

(10) Patent No.: US 8,579,092 B2
(45) Date of Patent: Nov. 12, 2013

(54) DAMPER UNIT

(75) Inventor: Motohiko Kimura, Fujisawa (JP)

(73) Assignee: Nifco Inc., Yokohama-Shi (JP)

( * ) Notice: Subject to any disclaimer, the term of this patent is extended or adjusted under 35 U.S.C. 154(b) by 185 days.

(21) Appl. No.: 12/736,242

(22) PCT Filed: Mar. 19, 2009

(86) PCT No.: PCT/JP2009/055450
§ 371 (c)(1),
(2), (4) Date: Sep. 23, 2010

(87) PCT Pub. No.: WO2009/119448
PCT Pub. Date: Oct. 1, 2009

(65) Prior Publication Data
US 2011/0011686 A1    Jan. 20, 2011

(30) Foreign Application Priority Data

Mar. 27, 2008  (JP) ................. 2008-084721
Mar. 12, 2009  (JP) ................. 2009-058833

(51) Int. Cl.
*F16F 9/54*    (2006.01)

(52) U.S. Cl.
USPC ........ 188/321.11; 188/67; 188/297; 188/313; 188/314; 188/381; 16/49; 16/66; 16/82; 16/83; 16/84; 16/85

(58) Field of Classification Search
USPC ............ 188/321.11, 322.22, 302, 305; 16/49, 16/71, 82–85
IPC ........................ E05F 5/02,5/10, 5/00
See application file for complete search history.

(56) References Cited

U.S. PATENT DOCUMENTS

| 1,549,705 | A | * | 8/1925 | Antonio | 217/60 R |
| 3,531,821 | A | * | 10/1970 | Burger et al. | 16/54 |
| 3,561,036 | A | * | 2/1971 | Crane | 16/49 |
| 3,576,046 | A | * | 4/1971 | Czapar | 16/55 |
| 2009/0273263 | A1 | * | 11/2009 | Berger | 312/334.1 |

FOREIGN PATENT DOCUMENTS

| JP | S49-76254 | A | 7/1974 |
| JP | H05-64551 | U | 8/1993 |
| JP | H09-177425 | A | 7/1997 |
| JP | H11-2066 | A | 1/1999 |
| JP | 2005-336983 | A | 12/2005 |
| WO | WO 2006111032 A1 * | 10/2006 | ................ E05F 5/00 |

* cited by examiner

*Primary Examiner* — Robert A Siconolfi
*Assistant Examiner* — San Aung
(74) *Attorney, Agent, or Firm* — Manabu Kanesaka

(57) ABSTRACT

A damper unit which brakes the speed of movement of a moving body by using a piston damper provided with a cylinder and a piston rod which is connected to a piston inside the cylinder, is provided. The damper unit includes a case wherein the above-mentioned piston damper is disposed; a transmitting member slidably provided inside the case and transmitting an external force accompanied by the movement of the above-mentioned moving body; a link member whose one end side is attached to the above-mentioned case so as to become the rotational center, and also whose the other end side is pivotally supported by the above-mentioned transmitting member; and a connecting member connected between both ends of the link member and being in contact with or connected to either the piston rod or the cylinder.

4 Claims, 6 Drawing Sheets

DAMPER UNIT

FIELD OF TECHNOLOGY

This invention relates to a damper unit which brakes the speed of movement of a moving body by using a piston damper.

BACKGROUND ART

A piston damper in FIG. 6(a) is a damper which is used in the damper unit of an embodiment of the present invention and is the same type as a structure disclosed in Patent Document 1. This piston damper 5 comprises a cylinder 50; a piston 52 dividing the inside of the cylinder in an axis direction; a piston rod 53 connected to the piston 52; urging means 7 provided between a retainer 57 placed in an inner end of the piston rod and an inner bottom face of the cylinder; and an accumulator 56 held through a retainer 55. The piston rod 53 is projected to the outside from the central hole of a cap 51 through a seal member 59. Also, the piston 52 comprises an inner member 54a integrated with the inner end of the piston rod 53, and an outer member 54b loosely fitted in the inner member 54a and forming a tubular orifice with a bottom which slides and contacts the inner periphery face of the cylinder 50. Also, the piston 52 includes a coil spring 58 disposed between both members 54a, 54b and separating them in the axis direction.

In the above-mentioned piston damper 5, usually, as shown in the above-mentioned figure, the piston rod 53 is largely projected to the outside by an urging force of the urging means 7. Also, the outer member 54b is in a state of being bumped into the retainer 57 which is placed in the piston rod 27 by an urging force of the coil spring 58. From this state, if the piston rod 53 is hit into, for example, a moving body, such as a door and the like, and pushed, the piston rod 53 is pushed into the cylinder 50 against the urging force of the urging means 7. Thereby, viscous fluid on a bottom side of the cylinder moves to a top side through the orifice of the outer member 54b and a space between both members 54b, 54a, and a fluid resistance at the time diminishes the energy applied to the piston rod 53. Also, if the compression coil spring 58 is set so as to compress by a fluid resistance applied to the outer member 54b when the piston 52 moves by a certain speed or above, the inner member 54a is entered into the outer member 54b accompanied by the contraction of the coil spring 58, so that the space between both members 54a, 54b is narrowed, and a braking force due to the fluid resistance increases.

A piston damper in FIG. 6(b) is a damper which is used in a modified example of the embodiment of the present invention and is the same type as a structure disclosed in Patent Document 2. In the above-mentioned figure, the same symbols are assigned to the same functional members shown in FIG. 6(a). This piston damper 5A comprises the cylinder 50 with the cap 51; the piston 52 dividing the inside of the cylinder in the axis direction; and the piston rod 53 connected to the piston 52. The piston rod 53 is projected to the outside from the central hole of the cap 51 through a seal member which is not shown in the figure. Also, the piston 52 comprises a stopper 8 firmly fixed to the inner end of the piston rod 53, and a sliding body 9 loosely fitted in the outer periphery portion of the stopper so as to be freely movable. The sliding body 9 includes a communicating hole (orifice) with a small cross-section area which is located near the outer periphery and penetrates right and left faces, and a communicating hole with a large cross-section area which is located near the inner periphery and penetrates the right and left faces. When the piston 52 moves, a fluid passes through, so that a damping force is produced. Specifically, in this structure, for example, if the piston rod 53 is moved in a direction projecting from the inside of the cylinder 50, or inversely, if the piston rod 53 is moved in a direction wherein a projecting amount is reduced, the sliding body 9 is pushed by a left end portion or a right end portion of the stopper 8 by a frictional force produced between the sliding body 9 and the cylinder 50, and closes the above-mentioned large communicating hole. Accordingly, the sliding body 9 is moved from the orifice on the top side of the cylinder to the bottom side, or inversely, the fluid on the bottom side of the cylinder is moved from the orifice to the top side, so that a braking force due to the frictional force and the fluid can be obtained.

Patent Document 1: Japanese Unexamined Patent Publication No. 2006-29564.

Patent Document 2: Japanese Patent No. 3465978.

DISCLOSURE OF THE INVENTION

Problems to be Solved by the Invention

As described in the publications, the above-mentioned respective piston damper is used in various fields, such as a door, drawer, sliding door, and the like. However, in a conventional structure, due to a length having a braking effect, i.e., a relation wherein a damper stroke is determined by a moving range of the piston and the piston rod, when the damper stroke is preferred to be lengthened, a piston damper that matches that length is required, for example, in a case that the damper stroke is preferred to be doubled, not only the piston damper is enlarged, but also the cost becomes high.

Consequently, the present invention provides a damper unit which can arbitrarily set the damper stroke even if it is the same piston damper, so that the damper unit can change the damper stroke to be longer by using an inexpensive piston damper with a short damper stroke.

Means for Solving the Problems

In order to achieve the above-mentioned object, a damper unit brakes the speed of movement of a moving body by using a piston damper provided with a cylinder and a piston rod which is connected to a piston inside the cylinder. The damper unit comprises a case wherein the above-mentioned piston damper is disposed; a transmitting member slidably provided inside the above-mentioned case and transmitting an external force accompanied by the movement of the above-mentioned moving body; a link member whose one end side is attached to the above-mentioned case so as to become the rotational center, and also whose the other end side is pivotally supported by the above-mentioned transmitting member; and a connecting member connected between both ends of the above-mentioned link member and being in contact with or connected to either the above-mentioned piston rod or the above-mentioned cylinder.

In the above-mentioned present invention, as the piston damper, for example, an existing piston damper as disclosed in the Patent Document 1 or 2, can be used, and when used, as in an embodiment, any of an aspect fixing the cylinder or an aspect fixing the piston rod may be used. The case incorporates the piston damper, the transmitting member, the link member, and the connecting member, and also is attached to a usage portion. The transmitting member is operated and connected to the moving body such as a lid, door, and the like which is a braking object, and transmits the external force (load) accompanied by the movement of the moving body to the piston damper through the link member and the connecting member. The connecting member is a member pushing the piston rod of the piston damper or the cylinder. The link member is intervened between the connecting member and the transmitting member which receives the load of the braking object, and allows a damper stroke of the piston damper and a load applied to the piston damper to be arbitrarily set.

The above-mentioned present invention is preferably embodied as follows.

(1) The above-mentioned connecting member has a structure connected to the above-mentioned link member to be capable of swaying.

(2) The above-mentioned connecting member has a structure slidably provided in the above-mentioned case through guide means.

(3) The present invention has a structure including urging means urging the above-mentioned transmitting member in a predetermined positional direction.

(4) The above-mentioned piston damper has a structure embedding the above-mentioned urging means.

Effect of the Invention

In the present invention, the link member is placed between the connecting member which pushes (the piston rod or the cylinder of) the piston damper, and the transmitting member which receives the load accompanied by the movement of the moving body, such as the lid, door, and the like, so that even if the piston damper (the damper stroke is M) is the same piston damper as shown in examples in FIGS. 3(a), 3(b), 4(a), 4(b), the damper stroke can be changed to L, L1, and the like which are longer than M. At the same time, the load applied to the piston damper can be arbitrarily set. Thereby, in the damper unit of the present invention, the damper stroke can be changed to an objective length, for example, by using an inexpensive piston damper. Also, the load, accompanied by the movement of the moving body which is the braking object, can be converted to a linear motion—rotary motion—linear motion by the transmitting member, the link member, and the like so as to enable to act on the piston damper.

If the above-mentioned connecting member has a structure connected to the above-mentioned link member to be capable of swaying, the rotary motion of the link member can be smoothly transmitted to a non-rotational connecting member. On the other hand, if the above-mentioned connecting member has a structure slidably provided in the above-mentioned case through the guide means, a damping force of the piston damper can be reliably and stably obtained.

If the structure includes the urging means urging the above-mentioned transmitting member in the predetermined positional direction, due to the urging means urging the transmitting member in the predetermined positional direction, the damping force of the piston damper relative to a moving load of the moving body can be obtained, and an operation pulling in one direction in the same manner as Patent Document 1 can be also obtained. On the other hand, if the above-mentioned piston damper is the structure embedding the above-mentioned urging means, the damper unit can be simplified.

BRIEF DESCRIPTION OF THE DRAWINGS

FIGS. 2(a), 2(b) show the above-mentioned damper unit, wherein FIG. 2(a) is a back view, and FIG. 2(b) is a front view.

BEST MODES OF CARRYING OUT THE INVENTION

Figure 1:
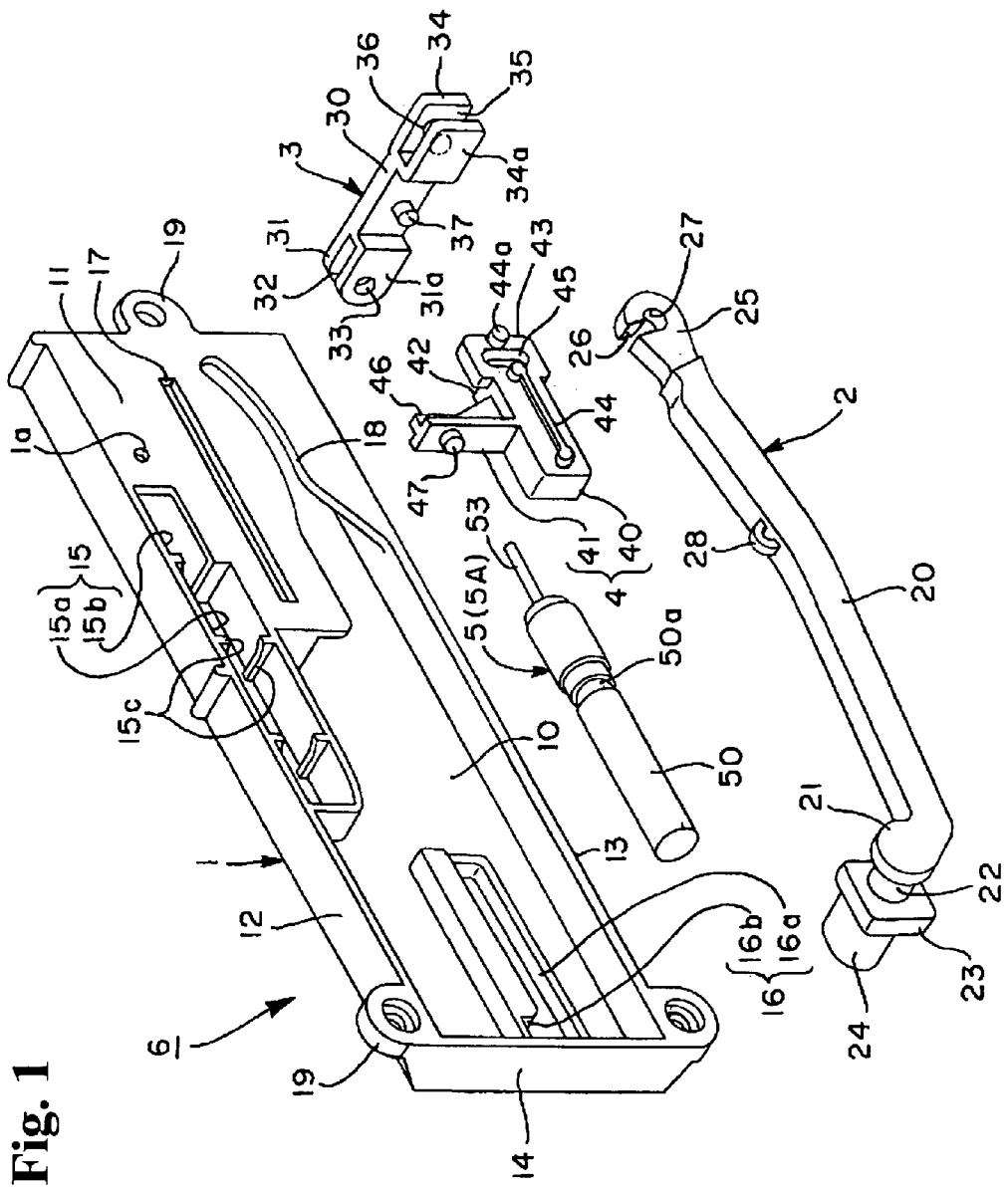
FIG. 1 is a schematic exploded perspective view wherein a damper unit of an embodiment of the present invention is disassembled.
Figure 2A:
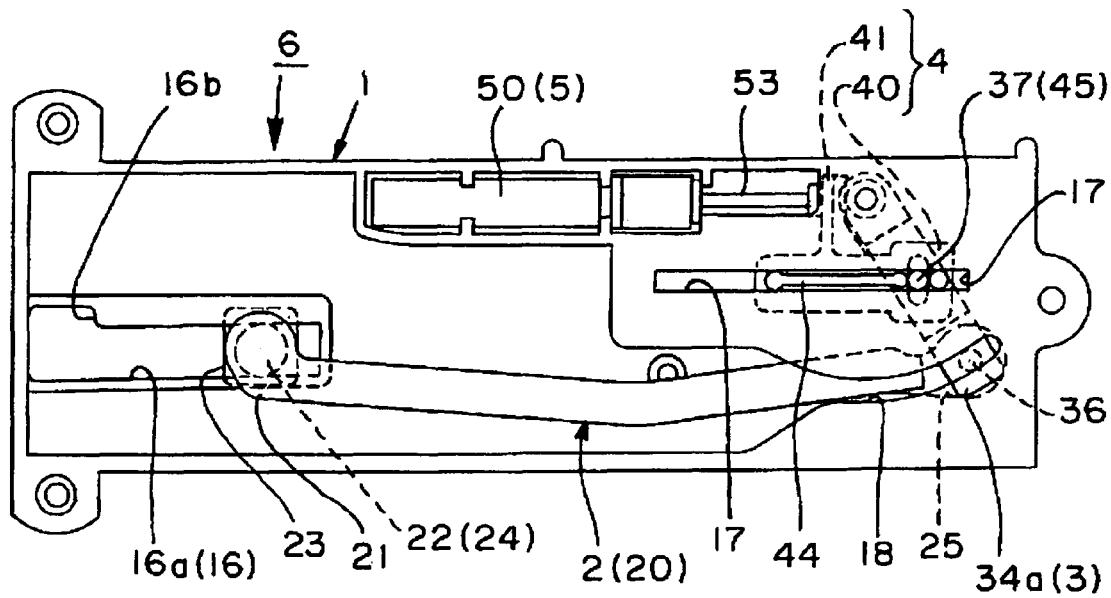
Figure 2B:
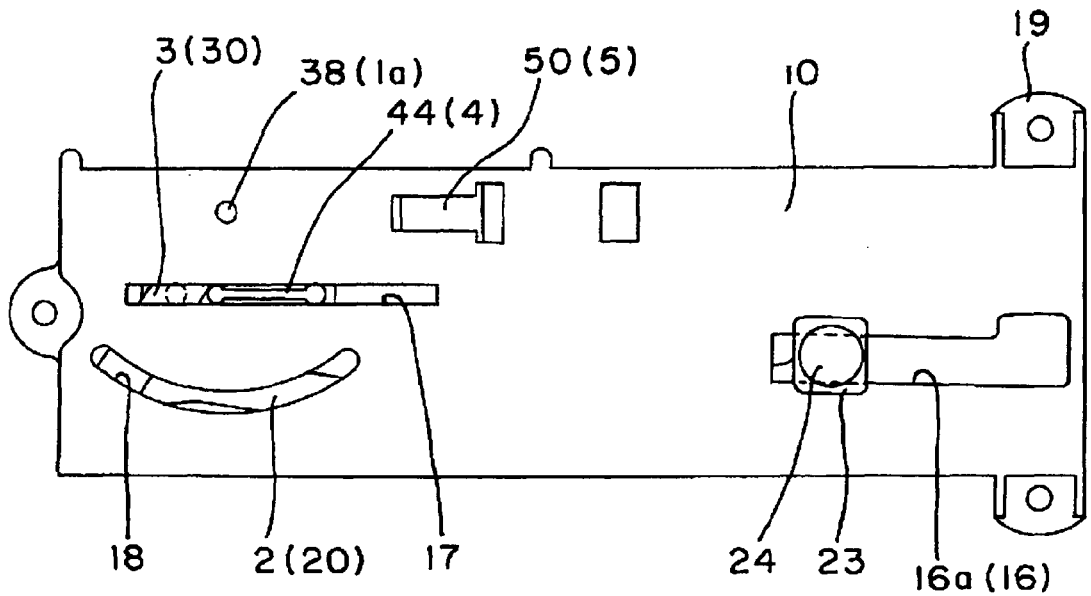
Figure 3A:
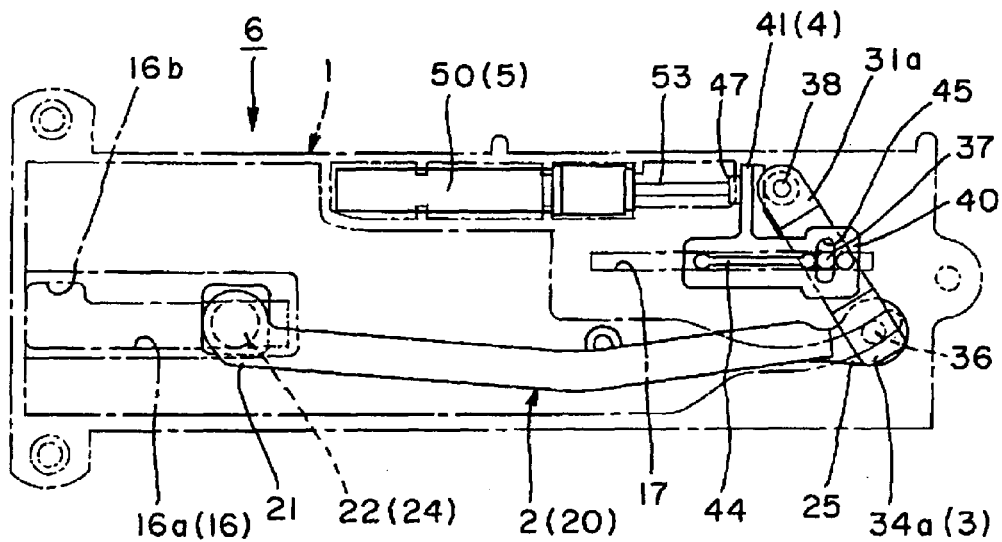
FIGS. 3(a), 3(b) are schematic operational views showing operations of the above-mentioned damper unit.
Figure 3B:
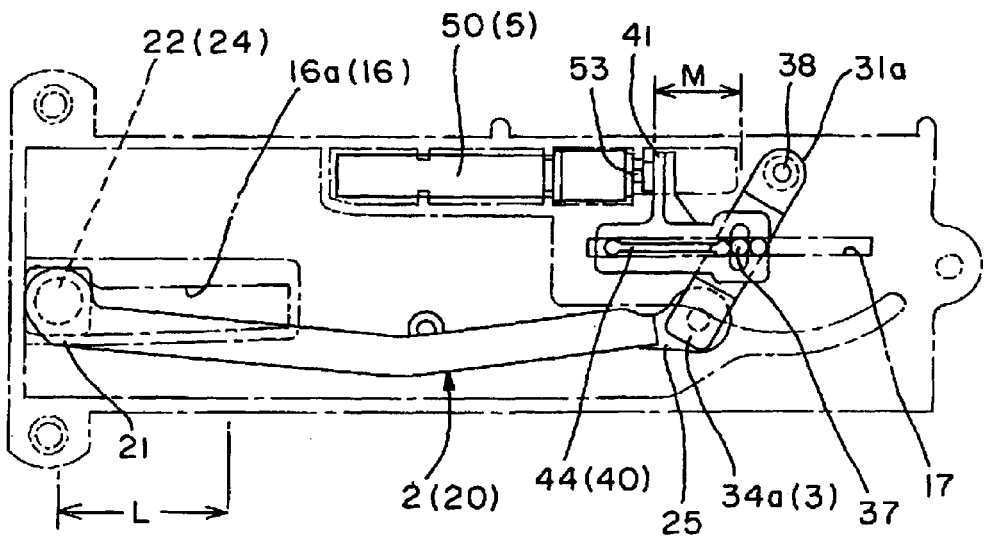
Figure 4A:
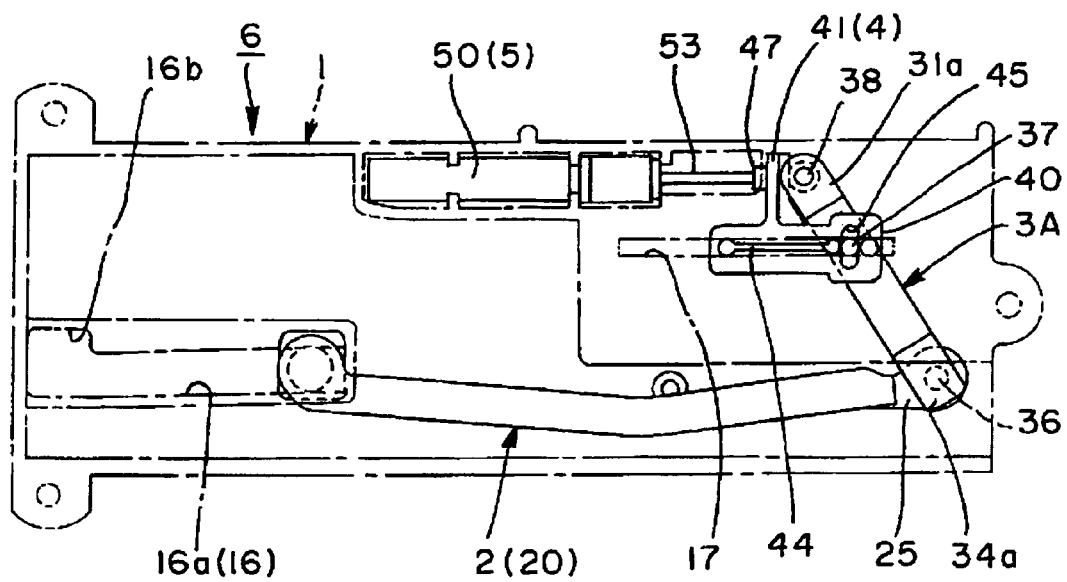
FIGS. 4(a), 4(b) are views showing a first modified example corresponding to FIGS. 3(a), 3(b).
Figure 4B:
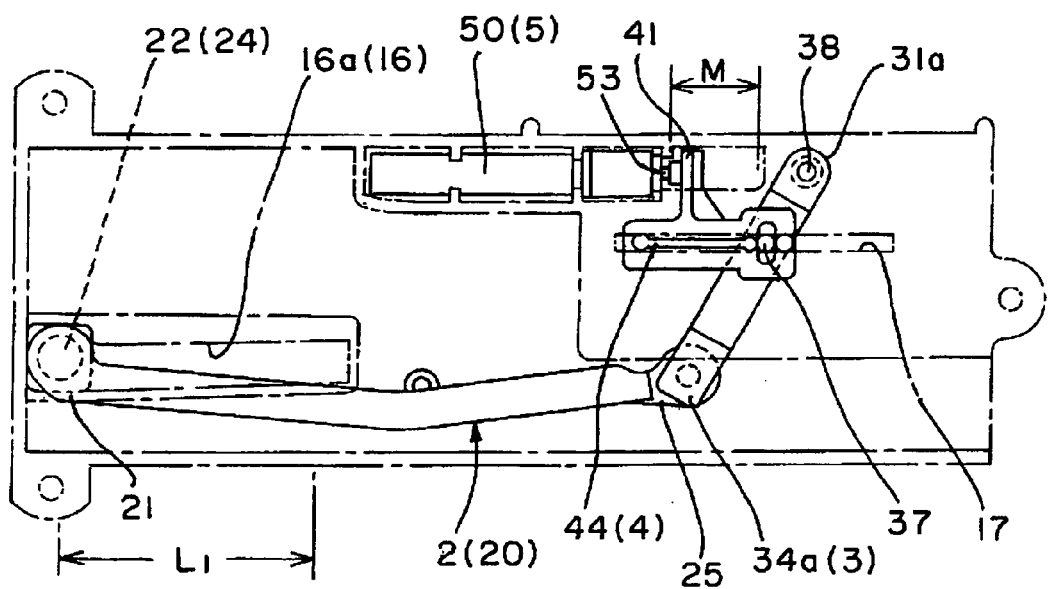
Figure 5A:
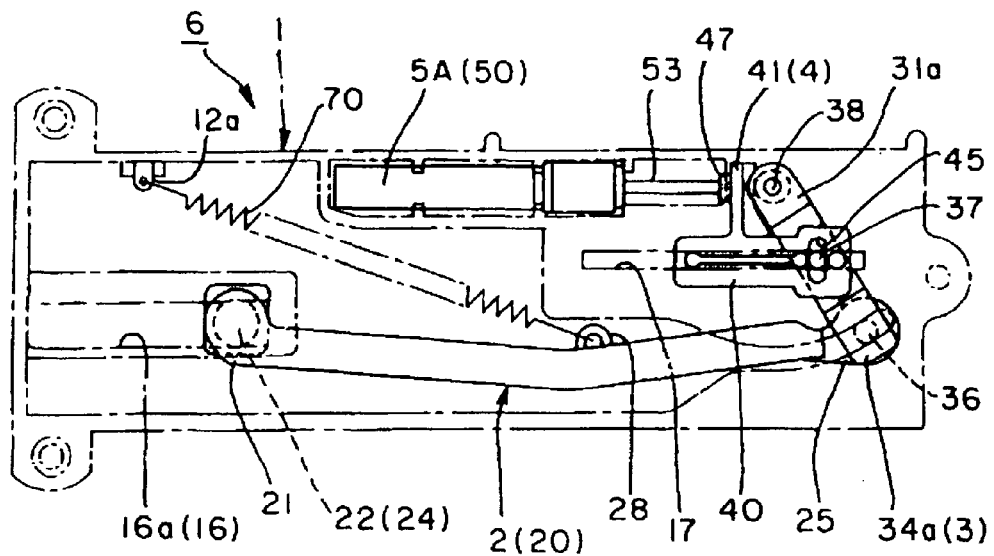
FIGS. 5(a), 5(b) are views showing a second modified example corresponding to FIGS. 3(a), 3(b).
Figure 5B:
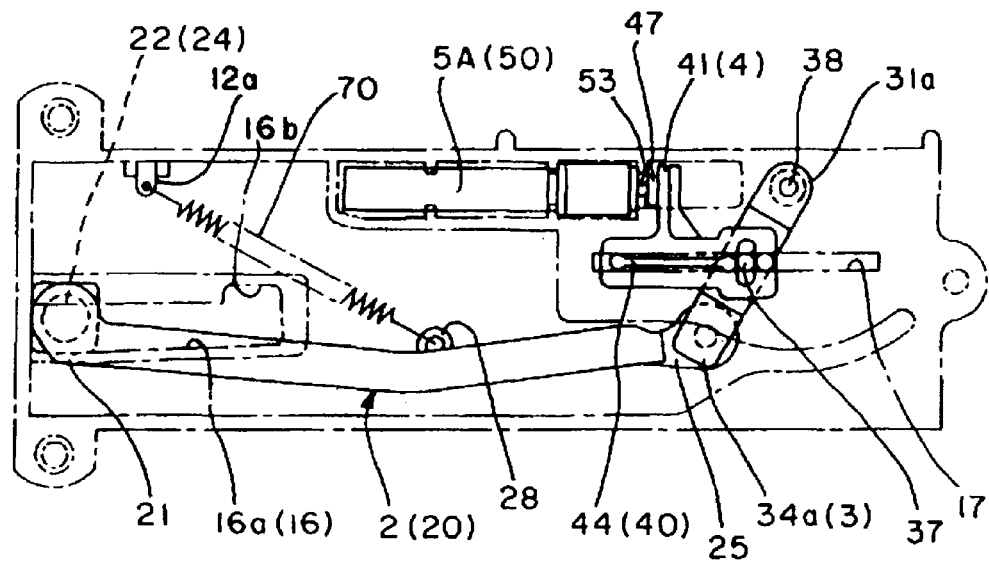

Embodiments of the present invention will be explained with reference to figures. FIG. 1 is a schematic exploded view of a damper unit, FIGS. 2(a), 2(b) are drawings viewed from front and back directions, FIGS. 3(a), 3(b) are schematic operational views, FIGS. 4(a), 4(b) show a first modified example, and FIGS. 5(a), 5(b) show a second modified example. Incidentally, although the damper unit of the present invention can apply to various moving bodies as disclosed in Patent Documents 1 and 2, in the following explanation of the embodiments, the moving body will be described by visualizing a lid or a door which opens and closes an opening of a main body for the sake of convenience.

Figure 6A:
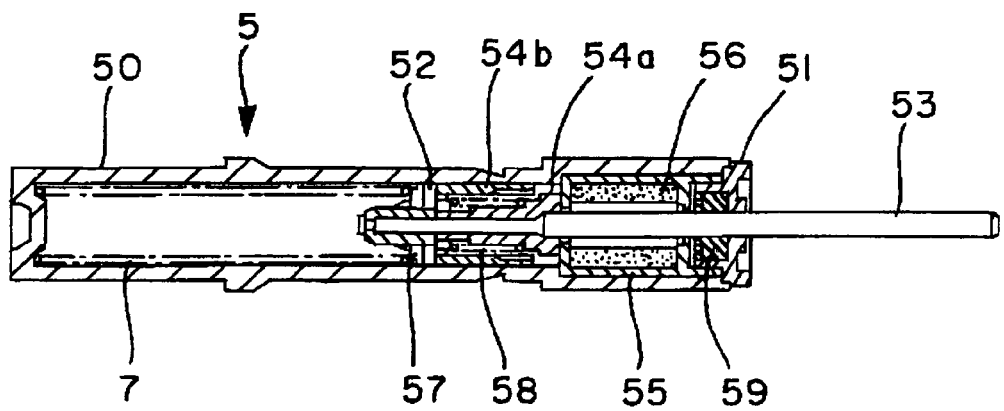
FIG. 6(a) is a cross sectional view showing a piston damper used in the embodiment of the present invention.
Figure 6B:
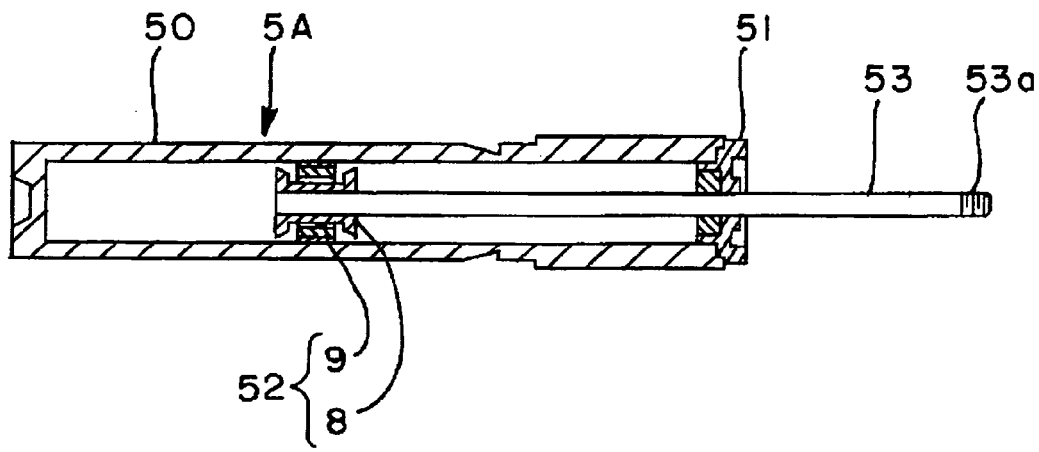
FIG. 6(b) is a cross sectional view showing the piston damper used in the above-mentioned second modified example.

(Structure) As shown in FIG. 1, a damper unit 6 of the embodiment comprises a case 1 with an approximately flat short shape; a transmitting member 2 slidably disposed in the case 1; a link member 3 rotatably pivoted relative to the case 1; a connecting member 4 connected to the link member 3; and a piston rod 5 or 5A. Incidentally, since the piston rods 5 and 5A are shown in FIGS. 6(a), 6(b) and have a structure which is the same as that of the piston rod disclosed in Patent Document 1 or 2 and explained as a background art, the explanation of the piston rods 5 and 5A themselves is omitted.

The case 1, the transmitting member 2, the link member 3, and the connecting member 4 are resin molding products. However, they may be made by a material other than resin. Here, as shown in FIGS. 1, 2(a), 2(b), the case 1 is slender in a front-back direction, and the inside portion is approximately divided by a front face 10 and a back face 11, upper and lower faces 12, 13, and one end face 14. Also, a large portion of the other end face and the back face 11 are open. The front face 10 is a side wherein a connecting portion 24, which is a portion wherein the transmitting member 2 disposed in the case 1 is operated and connected relative to the moving body such as the lid, the door, and the like, is projected from the inside of the case. In the case of FIG. 1, the front face 10 is a side face on a back side. Here, a placement portion 15, which is divided on an inner side and between the placement portion 15 and the front face, and engages a cylinder 50 of a piston damper, and a guide groove 16, which fits into the connecting portion 24 provided in the transmitting member 2, are provided. Also, in the front face 10 and the back face 11, a guide groove 17, which fits into transverse ribs 44 and a boss 44a provided in the connecting member 4; an axis hole 1a provided on the upper side of the guide groove 17; and a groove 18, which exposes the corresponding end of the transmitting member 2 and one portion of the link member 3, are provided and face one another.

Among those, the placement portion 15 comprises a portion 15a engaging and fixing the cylinder 50 of the piston damper, and a portion 15b placing a piston rod 53. The portion 15a includes multiple claws 15c clamping the cylinder 50 in a radial direction. The portion 15b opens the side opposite to the portion 15a. The guide groove 16 comprises a horizontal portion 16a horizontally extending from just behind one end face 14, and a large hole portion 16b curving upwardly from just behind the horizontal portion. On the other hand, the back face 11 lacks a portion including the guide groove 16, the placement portion 15, and the like, and also includes the above-mentioned guide groove 17, the axis hole 1a, the groove 18, and the like. The reference numeral 19 represents an attachment portion with a hole.

The transmitting member 2 includes an arm portion 20 forming a gentle arch; an axis portion 22, a collar portion 23, and a connecting portion 24 which are provided in one end portion 21 of the arm portion; a notch portion 26 and an axis hole 27 which are provided in the other end portion 25 of the arm portion; and a retaining portion 28 provided between both ends of the arm portion 20. The axis portion 22 is projected from a side face of one end portion 21. The collar portion 23 is inserted to the outside from the large hole portion 16b of the guide groove; and in a state wherein the axis portion 22 is fitted into the horizontal portion 16a of the guide groove, the axis portion 22 is retained. The connecting portion 24 is set in an arbitrary shape according to the moving body of a braking object, and is a portion receiving a load accompanied by the movement of the moving body. Also, the other end portion 25 is formed slightly thinner than the arm portion 20, and fits into the other end of the after-mentioned link member 3 to be capable of swaying. The retaining portion 28 is used as necessary at the time of the piston damper 5A.

The link member 3 includes a slender thin-walled plate portion 30; a portion 31a forming a concave portion 32 by dividing between the portion 31a and one end 31 of the plate portion; a portion 34a forming a concave portion 35 by dividing between the portion 34a and the other end 34 of the plate portion; an attachment hole 33 formed by penetrating in one end 31 and the portion 31a; an axis portion 36 connecting both inner faces of the concave portion 35; and an axis portion 37 projected from a side face of the plate portion 30.

On the other hand, the connecting member 4 is formed in an approximately inverted T-shape viewed from a lateral view, and comprises a horizontal piece portion 40 and a vertical piece portion 41. In FIG. 1, the horizontal piece portion 40 integrally includes an escape portion 42 provided on a front left side and disposing the plate portion 30 of the link member; a receiving portion 43 provided on a front right side and vertically elongated; a longitudinal hole 45 provided in the receiving portion 43 and allowing the axis portion 37 of the link member to be loosely fitted; the transverse ribs 44 provided on both side faces except the escape portion 42 and the receiving portion 43 and extending to right and left; and the boss 44a provided on one surface of the receiving portion 43 and positioned on an extended line of the transverse ribs 44. On the other hand, the vertical piece portion 41 integrally includes a reinforcement rib 46 provided on an escape portion 42 side, and a contacting portion 47 provided on a side face opposite to the reinforcement rib 46.

(Assembly) Next, an example of the assembly procedure of the above-mentioned respective members will be explained. First, in the case 1, the piston damper 5 or 5A is attached to the placement portion 15 through the multiple claws 15c by being pushed in from a state wherein the cylinder 50 is matched to the portion 50a. In this attached state, the end of the piston rod 53 projecting from the cylinder 50 can be freely entered into and out of the case from the portion 15b. Incidentally, a fitting groove 50a which engages the claws 15c is provided around the cylinder 50 which is used here.

Next, the transmitting member 2 and the connecting member 4 are mounted in the case 1. The transmitting member 2 is entered into the case from a back face 11 side of the case, and inserts the connecting portion 24 and the collar portion 23 on one end portion side to the outside from the large hole portion 16b of the guide groove. Also, the transmitting member 2 is retained in a state wherein the axis portion 22 is fitted into the horizontal portion 16a of the guide groove. The connecting member 4 is pushed into the case from the opening of the other end of the case, and mounted in a state wherein the transverse ribs 44 on both sides are fitted into the corresponding guide groove 17. In this state, as shown in FIGS. 2(a), 2(b), the connecting member 4 can slide through the transverse ribs 44 and guide means by the guide groove 17. Also, the contacting portion 47 is in contact with the end of the piston rod 53.

Next, the link member 3 is mounted in the case 1. In this operation, after the link member 3 is disposed inside the case from the opening of the other end of the case, and the attachment hole 33 on one end side is positioned relative to the axis hole 1a on a case side, a connecting pin 38 such as a split pin and the like is penetrated into the axis hole 1a on one side, the attachment hole 33 on one side, the attachment hole 33 on the other side, and the axis hole 1a on the other side, so that the link member 3 is supported so as to be freely rotatable in a pendulum manner as a supporting point of the connecting pin 38.

If the link member 3 is pushed to a connecting member 4 side through, for example, the other end 34 from the pivotally supported state, the plate portion 30 moves to the escape portion 42, and at the same time, the axis portion 37 is fitted into the longitudinal hole 45. Thereby, the link member 3 is connected to the connecting member 4 to be capable of swaying through the fitting of the axis portion 37 and the longitudinal hole 45. Also, for example, if the other end portion 25 of the transmitting member is pressed against the concave portion 35, the axis hole 27 is fitted into the axis portion 36 on a concave portion side through the notch portion 26. Thereby, the link member 3 is also connected to the transmitting member 2 to be capable of swaying. Accordingly, the damper unit 6 is mounted.

(Operation) FIGS. 3(a), 3(b) show operations of the damper unit 6, FIG. 3(a) shows an initial state of the damper unit 6, and FIG. 3(b) shows an operation completion state of the damper unit 6.

(A) In the initial state of FIG. 3(a), as shown in FIG. 6(a), in the piston damper 5, the piston rod 53 projects from the cylinder 50 the longest by being urged by urging means 7. In the connecting member 4, the contacting portion 47 is pushed by the end of the piston rod 53, and is slid to the most right side in FIG. 3(a). The link member 3 is pushed by the connecting member 4 through the fitting of the axis portion 37 and the longitudinal hole 45 so as to be rotated in an anticlockwise direction only for a predetermined angle as the supporting point of the connecting pin 38. The transmitting member 2 is approximately horizontally moved in a rotational direction of the link member 3 through the fitting of the axis hole 27 and the axis portion 36.

(B) Then, in the damper unit 6, from the above-mentioned initial state, when the moving body (door, lid, or the like) is operated and connected to the connecting portion 24 of the transmitting member while moving to the left side from the right side in the above-mentioned figure, the transmitting member 2, the link member 3, and the connecting member 4 are driven in synchronization, and also brake the movement of the moving body while receiving a braking operation by the piston damper 5. In other words, the transmitting member 2 is operated and connected to the moving body through the connecting portion 24, and moves in the same direction of the moving body. At that time, in this structure, an external force (load) accompanied by the movement of the moving body is transmitted to the piston rod 53 of the piston damper 5 from the transmitting member 2 through the link member 3 and the connecting member 4. Consequently, the speed of movement of the moving body is braked by the piston damper 5 while a projecting amount of the piston rod 53 is being reduced through the transmitting member 2, the link member 3, and the connecting member 4 so as to move slowly. The above-mentioned braking is shown in the operation completion state in FIG. 3(b) wherein the piston rod 53 is withdrawn the most relative to the cylinder 50.

(C) In the above-mentioned structure, the connecting member 4 which pushes (the piston rod 53 or the cylinder 50) of the piston damper 5, and the transmitting member 2 which receives the load accompanied by the movement of the moving body are operated and connected through the link member 3 which is rotated as the supporting point of the connecting pin 38. Accordingly, a damper stroke L of the damper unit 6 becomes longer than a damper stroke M of the single piston damper 5. In this example, the damper stroke L is approximately doubled compared to the damper stroke M. The benefits are that the damper stroke can be changed to an objective length, for example, by using an existing inexpensive piston damper 5, or that the load accompanied by the movement of the moving body which is the braking object, can be converted to a linear motion-rotary motion-linear motion by the transmitting member 2, the link member 3, and the like so as to enable to act on the piston damper 5.

(D) In the above-mentioned structure, as the piston damper 5, a type wherein the piston rod 53 projects by the urging means 7 is used, so that, for example, if the load is released in the operation completion state of FIG. 3(b), the moving body is automatically pulled in up to the initial state through the transmitting member 2 and the link member 3, and the connecting member 4 and the piston rod 53 again. Specifically, the damper unit 6 also acts as a pull-in mechanism.

First Modified Example

The modified example of FIGS. 4(a), 4(b) is one example wherein the above-mentioned damper stroke L is lengthened further.

In this explanation, the same symbols will be assigned to the same members and the same functional portions as those of the above-mentioned embodiment, and duplicated descriptions will be omitted as much as possible.

In the first modified example, the overall size of a link member 3A is longer than that of the above-mentioned link member 3, and when the link member 3A is rotated as the supporting point of the connecting pin 38, an arc traced by the other end 34 of the plate portion is also set so as to become slightly larger than that by the link member 3. Consequently, in this structure, compared to FIGS. 3(a), 3(b), although a damper stroke L1 of the damper unit 6 becomes longer than the damper stroke M of the single piston damper 5, in this example, the damper stroke L1 is approximately tripled compared to the damper stroke M. This shows that the damper unit 6 can easily change the damper stroke L or L1 to an arbitrary length while using the same piston damper 5.

Second Modified Example

The modified example of FIGS. 5(a), 5(b) is one example wherein the above-mentioned piston damper 5 is changed to the simplified piston damper 5A, and also wherein urging means 70 for pulling in as mentioned above is additionally provided.

In this explanation, the same symbols will also be assigned to the same members and the same functional portions as those of the above-mentioned embodiment, and the duplicated descriptions will be omitted as much as possible.

In this modified example, the piston damper 5A comprises the structure of FIG. 6(b). In the case 1, a spring retaining portion 12a is provided on the upper side of the guide groove 16. Then, an extension coil spring is used for the urging means 70, and is mounted in a state wherein one end of the extension coil spring is locked in the retaining portion 12a, and the other end of the extension coil spring is locked in the retaining portion 28 of the transmitting member 2. In this case, although the guide groove 16 comprises the horizontal portion 16a and the large hole portion 16b, the large hole portion 16b is provided in the opposite side (right side in FIG. 5(b)) of the horizontal portion 16a compared to the above-mentioned embodiment and the first modified example. Also, the large hole portion 16b can be engaged with the axis portion 22, and as shown in FIG. 5(a), the extension coil spring 70 is engaged with the axis portion 22 with a state of storing urging forces through the transmitting member 2, and maintains the engaged state to be releasable. Also, in this structure, the end of the piston rod 53 constituting the piston damper 5A is fixed to the contacting portion 47 constituting the connecting member 41 by appropriate connecting means. Then, in this example, FIG. 5(a) is in the initial state of the damper unit 6 corresponding to FIG. 3(a) or 4(a). FIG. 5(b) is in the operation completion state of the damper unit 6 corresponding to FIG. 3(b) or 4(b). Each operation from the initial state to the operation completion state, and from the operation completion state to the initial state, is substantially the same as that of the above-mentioned embodiment.

As mentioned above, details of the damper unit of the present invention can be variously modified provided that they substantially comprise the structure specified in claims.

Incidentally, all contents of the specifications, claims, drawings, and abstracts of Japanese Patent Applications No. 2008-84721 filed on Mar. 27, 2008 and No. 2009-58833 filed on Mar. 12, 2009 are cited in their entirety herein and are incorporated as a disclosure of the specification of the present invention.

What is claimed is:

1. A damper unit for reducing a speed of movement of a moving body, comprising:
   a case;
   a piston damper disposed in the case, and having a cylinder, a piston slidably disposed inside the cylinder, and a piston rod connected to the piston and projecting outwardly from the cylinder;
   a link member having one end directly rotationally attached to the case, the other end, and a middle portion between the one end and the other end;
   a transmitting member slidably disposed inside the case and pivotally attached to the other end of the link member, the transmitting member transmitting an external force accompanied by the movement of the moving body to the link member; and
   a connecting member pivotally attached to the middle portion of the link member and contacting with or connected to the piston rod or the cylinder so that force applied to the transmitting member from the moving body is transmitted to the piston damper through the link member and the connecting member,
   wherein said connecting member comprises a horizontal portion horizontally slidably disposed parallel to the piston damper in the case and pivotally attached to the link member, and a vertical portion fixed to the horizontal portion and connected to or contacted with the piston damper.

2. A damper unit for reducing a speed of movement of a moving body, comprising:

a case;

a piston damper disposed in the case, and having a cylinder, a piston slidably disposed inside the cylinder, and a piston rod connected to the piston and projecting outwardly from the cylinder;

a link member having one end directly rotationally attached to the case, the other end, and a middle portion between the one end and the other end;

a transmitting member slidably disposed inside the case and pivotally attached to the other end of the link member, the transmitting member transmitting an external force accompanied by the movement of the moving body to the link member; and a connecting member pivotally attached to the middle portion of the link member and contacting with or connected to the piston rod or the cylinder so that force applied to the transmitting member from the moving body is transmitted to the piston damper through the link member and the connecting member, wherein said connecting member comprises a horizontal portion horizontally slidably disposed parallel to the piston damper in the case and pivotally attached to the link member, and a vertical portion fixed to the horizontal portion and connected to or contacted with the piston damper, the case includes a first guide groove disposed on a front surface thereof and a second guide groove disposed parallel to the first guide groove on a back surface thereof;

the transmitting member includes a connecting portion disposed at one end thereof and fitting into the first guide groove, and slides in a longitudinal direction thereof on the first guide groove; and the connecting member includes a rib disposed on the horizontal portion and fitting into the second guide groove, the connecting member sliding in a same direction as the transmitting member on the second guide groove through the link member.

3. A damper unit according to claim 2, wherein the connecting member further includes a boss disposed apart from the rib and a hole disposed between the rib and the boss, and the link member includes an axis portion provided at the middle portion thereof and engaging the hole to transmit the external force to the connecting member.

4. A damper unit according to claim 3, wherein the first guide groove includes a horizontal portion, and a hole portion curving upwardly from the horizontal portion at one end thereof, and the connecting portion of the transmitting member is releasably held in the hole portion.

* * * * *